Patented May 19, 1925.

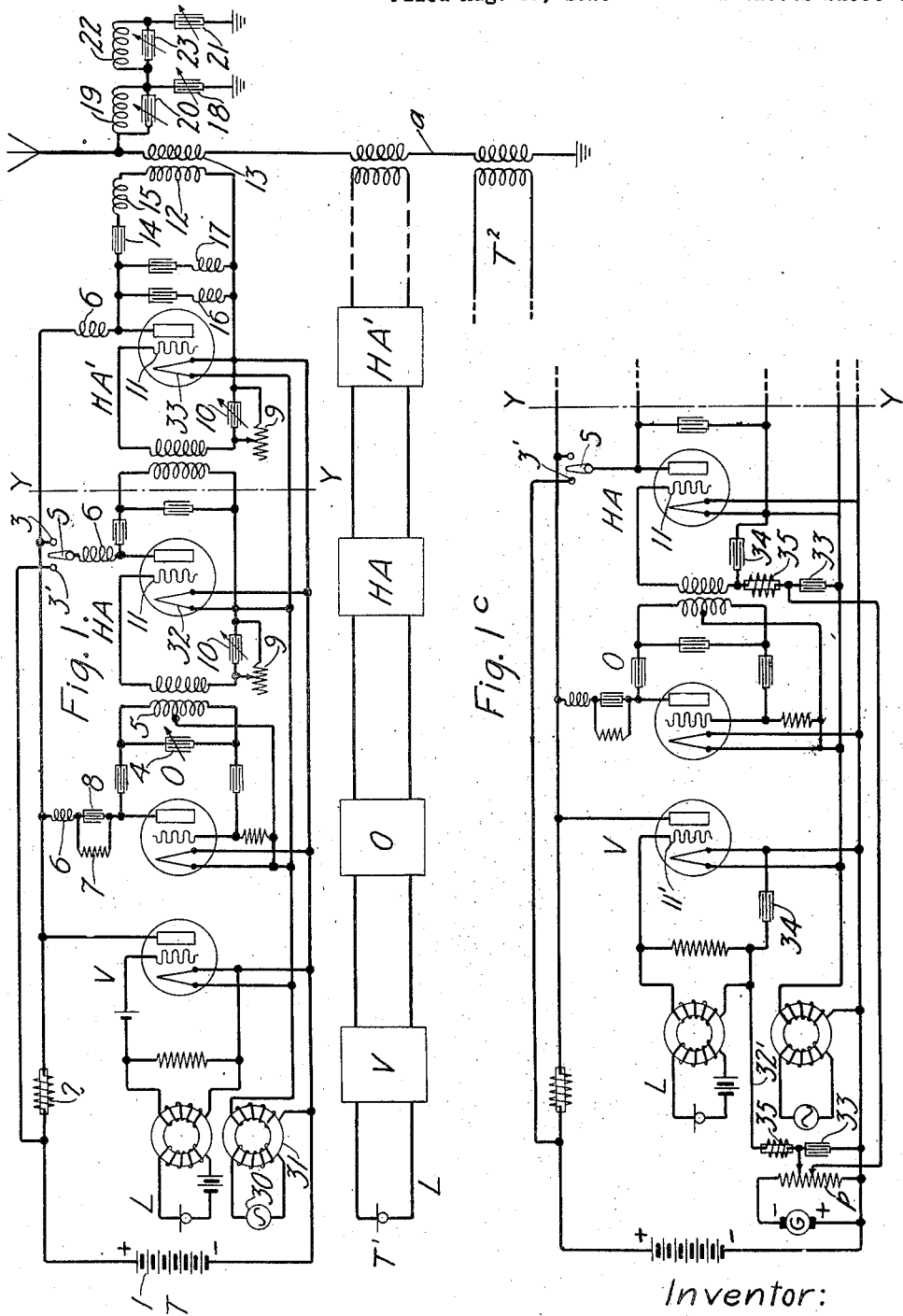

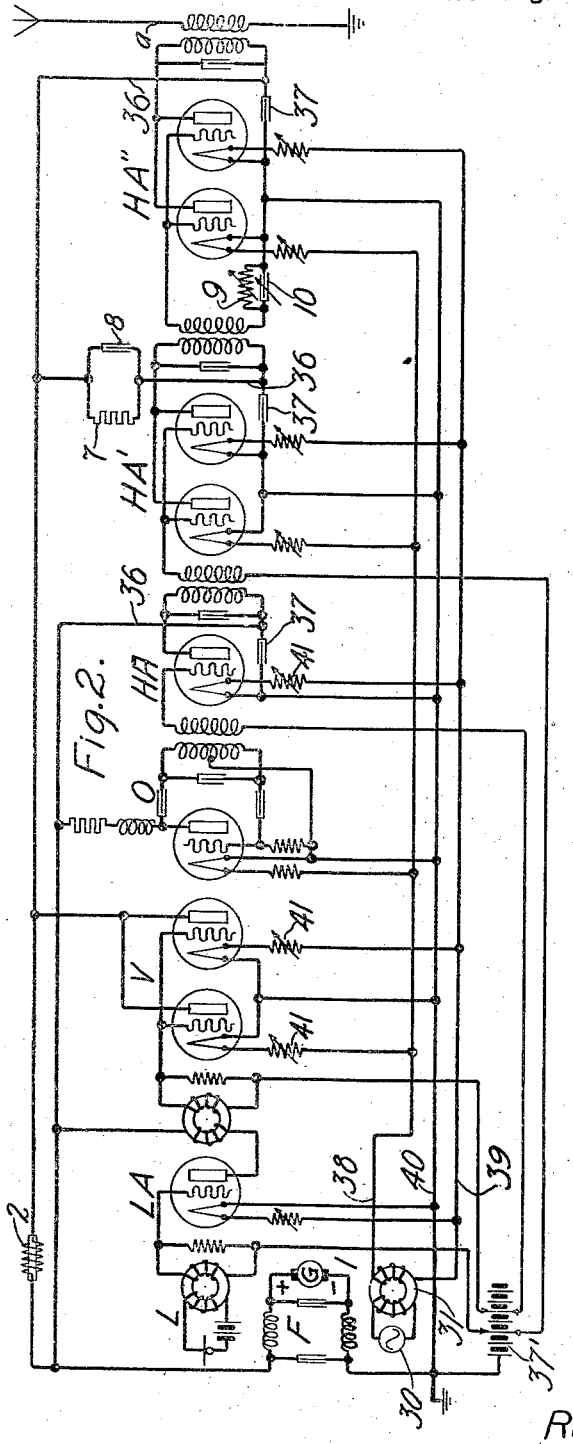
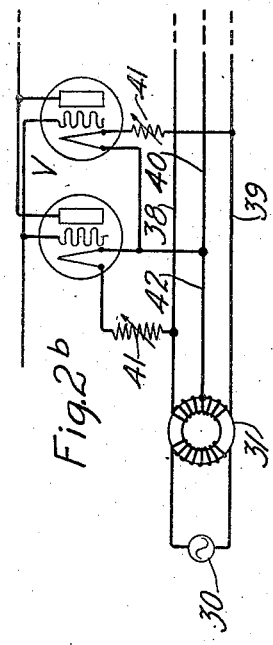
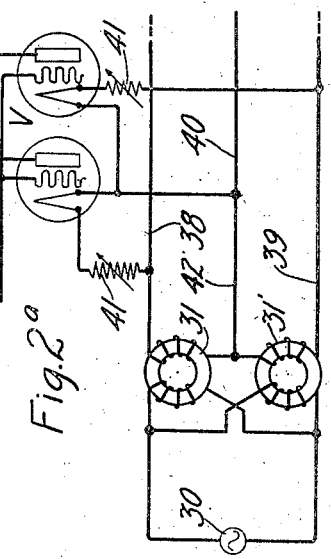

1,537,941

UNITED STATES PATENT OFFICE.

RAYMOND A. HEISING, OF EAST ORANGE, NEW JERSEY, ASSIGNOR TO WESTERN ELECTRIC COMPANY, INCORPORATED, OF NEW YORK, N. Y., A CORPORATION OF NEW YORK.

WAVE TRANSMISSION.

Application filed August 17, 1920. Serial No. 404,258.

*To all whom it may concern:*

Be it known that I, RAYMOND A. HEISING, a citizen of the United States, residing at East Orange, in the county of Essex, State of New Jersey, have invented certain new and useful Improvements in Wave Transmissions, of which the following is a full, clear, concise, and exact description.

This invention relates to improved arrangements for heating the filamentary or other cathodes of a system of vacuum tube repeaters or equivalent systems of vacuum tubes by alternating current or fluctuating direct current. An object of the invention is to reduce to a minimum the effect of the alternations or fluctuations on the input and output circuits of the tubes.

In carrying out the invention circuit arrangements are provided whereby the disturbing effect produced in the circuit of one tube or tubes is balanced or counteracted by the disturbing effect produced in another tube or tubes. In one arrangement for this purpose the particular terminals of some of the filaments which are connected to their associated plates and grids are directly connected to one side of the filament heating circuit and the terminals of other filaments which are directly connected to their associated grids and plates are connected to the other side of the circuit. In another arrangement a three wire or divided circuit is employed. Some of the vacuum tube filaments are connected to one side of the divided circuit and some to the other side. A neutral conductor, which may be grounded, is employed. By connecting part of the tubes to one side of the circuit and part to another side the tendency of the alternating current to introduce undesirable effects in the system is greatly reduced.

In general, this tendency is to produce a cyclic variation in the grid and plate circuits corresponding in frequency to the frequency of the alternating heating current or a multiple thereof. This is due to the fact that the average potential of the filament with respect to the grid and cathode tends to change in this cyclic manner. The two forms of circuit described herein have the common feature of counter-acting the effect produced upon one tube or group of tubes by a substantially equal and opposite effect upon another tube or group of tubes. Various modified arrangements of each of these forms of circuits may be utilized.

Batteries, such as dry batteries have been frequently and commonly used, heretofore, to polarize the grids of vacuum tubes with respect to their cathodes. There are several disadvantages in the use of batteries for this purpose. The electromotive force of most batteries is highly variable and is much higher when they are fully charged than when they are wholly or partially discharged. Furthermore, batteries of this kind often become discharged from leakage currents or other causes during periods when the system in which they are included stands idle. Constant testing is, therefore, necessary to secure a reasonable degree of reliability. Furthermore, when such batteries are discharging current their terminal electro-motive force is very much less than when current is passing therethrough in a charging direction which often occurs owing to the leakage current which passes in the grid circuit of tubes. Variations of grid potential will result from this action. Thus with a dry cell battery with which upon open circuit the electro-motive force is ten volts, the discharging electro-motive force may be only seven volts. If such a battery is placed in circuit to negatively polarize the grid of a tube, and leakage current passes in a reverse direction through the battery the terminal potential differences across the leak path circuit rise to fourteen volts or higher. In order to avoid these difficulties it is proposed to employ mechanical generators as sources to apply working potentials to the grids of tubes. Heretofore it has been thought impractical to do this because the fluctuations in the current from such generators would be impressed upon the grid. As small variations of potential upon the grid of a tube in general cause a large variation of output current, an objectionable disturbance results. One or more current variations in the direct current supplied from a direct current machine usually have a frequency within the range of audition. Hence the variations are especially undesirable in modulating systems for use in the radiation of electromagnetic waves of considerable power. It is proposed to utilize a filter for eliminating the commutator and other noise producing variations from the grid circuit. A simple filter if properly designed and suitably related to the grid circuit is found to function efficiently. A by-pass for allowing the alternating current supplied to the input circuit of the vacuum tube to pass around the generator circuit is provided. This by-pass may comprise one or more of the elements that make up the filter. By making use of a potentiometer in circuit with the generator the grids of a number of tubes having different functions may be polarized from a single machine.

A precise adjustment of grid voltage may be secured which will remain substantially constant so long as the machine voltage remains constant. Variations in leakage current through the grid circuit will have little effect upon the system, particularly if the resistance of the grid polarizing machine be made small.

Other and more specific objects of the invention will be apparent from a perusal of the appended claims.

The various features of the invention will be better understood by reference to the following description, taken in connection with the accompanying drawing, wherein Fig. 1 represents a multiplex radio system having three transmitting systems for transmitting three telephone conversations simultaneously by means of one antenna, a complete circuit diagram of one of the systems being shown, the second system being outlined by rectangular blocks, and the third being merely indicated; Fig. 1ᶜ is a modified form of circuit illustrating the adaptability of a machine generator for polarizing the grids of the vacuum tubes shown in Fig. 1 and constitutes a substitute for that portion of Fig. 1 to the left of the line Y—Y; Fig. 2 is a complete system which may be substituted for any one of the three transmission systems of Fig. 1; Figs. 2ᵃ and 2ᵇ illustrate alternative forms of the filament heating circuit illustrated in Fig. 2.

Referring in detail to Fig. 1, the line L represents any circuit such as a telephone line, in which are produced low frequency signalling waves to be transmitted upon a high frequency carrier wave. The low frequency waves are impressed upon the input circuit of a three-electrode vacuum tube system V which typifies any variable impedance system. The anode-cathode circuit of the system V is supplied from the source 1 through a choke coil 2 which is adapted to prevent the passage of current variations having frequencies such as exist in line L. Assuming that the switch "s" is positioned upon the contact 3 then there will be connected in parallel with the system V with respect to the source 1 and coil 2, an oscillation generating system O, a high frequency amplifying system HA and a second high frequency amplifying system HA'. Each of the systems V, O, HA and HA' may consist of a single vacuum tube or equivalent device or any suitable number of vacuum tubes or equivalently functioning devices arranged in parallel. The system V may be of any kind which efficiently varies the space current of the remaining tubes of the system. The oscillating system O as illustrated is of a well-known type and generates high frequency oscillations in a tuned circuit comprising capacity 4 and inductance 5. Space current is supplied to the system O through a radio frequency choke coil 6 which prevents high frequency variations from passing therethrough. Resistance 7 serves to reduce the direct potential impressed upon the space current path of the system O while the capacity 8 allows speech frequency variations to pass readily. The function of resistance 7 and capacity 8 is to cause the oscillations generated by the oscillator to be more completely modulated. Since the space current in the system will be varied in accordance with low frequency variations of impedance in the system V, the waves generated by system O will be modulated in accordance with these low frequency waves. The modulated waves produced are impressed upon the input circuit of the high frequency amplifying system HA, of which the output circuit is connected to the input circuit of the second amplifying system HA', for further amplification. Assuming that switch "s" is positioned on contact 3, the space current of the system HA will be varied in a similar manner as that of the system O. The amplifying power or efficiency of the system HA will as a result of this tend to be moderately greater at those instants when the waves supplied to its input circuit are of large amplitude than at those instants when the waves supplied to its input circuit are of small amplitude. A variable amplification of the applied high frequency will, therefore, result, tending to produce a greater disparity in the amplitude of the waves in the output circuit of the system HA than exists in the waves supplied to the input circuit. The space current of the system HA' will undergo a corresponding variation and the effect of this system upon the waves supplied to its input circuit will be similar to that of the preceding amplifier. By moving the switch "s" to the contact 3' the amplifying system HA will not have its space current supplied through the coil 2 and hence it will tend to act as an ordinary amplifier. The coil 2 constitutes a high inductive impedance for waves of signaling i. e. speech frequencies. Source 1 and coil 2 together form a highly inductive source.

Still other means are provided whereby the systems HA and HA' may be made to function as substantially distortionless or non-modulating amplifiers even though their space current is supplied through the coil 2. This is accomplished by providing in the input circuit of each of these systems, a leak path consisting of a variable resistance 9 in shunt to a capacity 10. The negative charge upon the grids 11 will increase when the amplitude of the waves supplied to the input circuit increases and decrease when this amplitude decreases, since this charge is at any instant due to the rate of supply of electrons from the filament combined with the rate of leakage through the resistance 9. When the waves of relatively larger amplitude are applied the supply of electrons to the grid is more rapid, hence when the amplitude of the supplied wave increases, the successive waves will cause a large leakage current to flow to the grids 11 as compared to the leakage current flowing when the amplitude is small. Since the amplyfying power of a discharge repeater of this type tends to decrease as the negative charge upon the grid increases, it will be seen that this compensates for the variation in the amplyfying power caused by low frequency variations in the anode cathode potential supplied to the tube. The extent of this compensation may be varied through a wide range by variations in the capacity 10 and the resistance 9. It will also depend upon the particular design of the vacuum tube being used. In some instances it may be desirable to so adjust the systems HA and HA' that modulation of the waves repeated thereby will be effected. In other instances, however, it may be desirable to so adjust the systems that the minimum of such modulation is affected. Even though no modulation is taking place in both of these systems or either of them, there are certain advantages connected with the supplying of their space current through the choke coil 2. An important one of these advantages is that the total energy consumption in the amplifying systems with a given high frequency energy output is reduced. The output circuit of system HA' is coupled to the antenna system "a" by inductively related coils 12 and 13. Coil 12 is located in a path including condenser 14 and inductance 15 which is tuned to the mean frequency generated by the oscillating system O. Shunt paths 16 and 17 are tuned by means of inductance and capacity to offer low impedance to waves of the frequencies produced by the oscillating system O of transmitters T¹ and T² respectively. The energy impressed upon the coil 12 from the systems T¹ and T² is thus short circuited through the paths 16 and 17 and is not impressed to a material extent upon the space current path of the amplifier HA'. In this manner, intermodulation of the outgoing waves is prevented. The systems T¹ and T² may identical with transmitter T except for the modification necessary to produce other frequencies or they may differ from the transmitter T. One of these systems may, for example, be similar to that illustrated in Fig. 1ᶜ and the other similar to that illustrated in Fig. 2.

It is desirable that the antenna system "a" be given several degrees of freedom corresponding to the frequencies of the several carrier waves impressed thereon. This is conveniently accomplished in one manner by tuning the antenna to the shortest wave length to be radiated which we may assume will be that of transmitter T. A variable capacity 18 in shunt to the aerial-ground capacity of the antenna series to tune to the next longer wave length which we may assume to be that of system T'. A loop-resonant circuit containing inductance 19 and capacity 20 is included in series with capacity 18 and is tuned to be resonant at the shortest wave length, thereby offering a high impedance to the current of these waves. The tuning for the next longer wave length is accomplished by adding a capacity 21 in shunt to the capacity 18 and providing an additional loop resonant circuit consisting of inductance 22 and capacity 23 for preventing the energy of the waves of the intermediate frequency from passing therethrough. In tuning, of course, the reactance of the loop resonant circuits for the waves to which they are not attuned will be allowed for in adjusting the capacities 18 and 21.

An alternating current source 30 is provided to heat the cathodes of the vacuum tubes. The current is supplied through a transformer 31 across the secondary of which the filaments of the tubes are arranged in parallel. It will be noted that the terminals of the filaments 32 and 33 which are connected to the grids are connected to opposite terminals of the alternating current source. Thus when the terminal of the filament 32 which is connected to its associated grid, is made positive by the alternating current the terminal of the filament 33 which is attached to its associated grid, is made negative. The same condition is true as regards the terminals of the two filaments which are connected to their respective anodes but this is less important as the effect produced in the grid circuit is much greater. It will be seen that the distorting effect produced in the amplifying system HA by the alternating current heating source will be, to a large extent, compensated for by an equal and opposite effect produced in the system HA'. With respect to the system V and the system O and other similar combinations of oscillator and variable impedance tubes, it makes little differences whether their filaments are oppositely or similarly connected to the heating current source. In general the disturbance introduced seems to be comparatively small in either case. The advantages of heating the filaments of a number of discharge tubes of a system by alternating current are considerable, provided the disturbances introduced can be reduced to a small value without undue complication of apparatus or the introduction of a large number of transformers. In the systems herein described, it will be noted that only a single transformer is necessary to connect the alternating current line with the system of tubes. If the primary of this transformer is electrostatically shielded from the secondary, the electro-static separation of the supply line and the radio system is complete.

Fig. 1ᵉ illustrates the application of a mechanical generator for polarizing the grids of one or more vacuum tubes or systems of tubes. Suppose it is desired to utilize a mechanical generator to apply a negative potential to the grids 11 and 11'. The generator G is connected in circuit with the potentiometer resistance $p$. The positive terminal of this potentiometer is connected to the cathodes of the system V and HA and taps are taken out from the potentiometer to the respective grids. The tap to the grid 11' is through the conductors 32'. In addition to the steady direct current, the output of generator G will have superimposed thereon, fluctuations due to the effect of the commutator segments. In order to reduce the effect of these fluctuations upon the vacuum tube systems, a filter is provided comprising condensers 33 and 34 in shunt to the portion of the potentiometer included in the grid circuit while inductance 35 is included in series therein. Various forms of filters comprising any desired or necessary number of elements may be utilized for this purpose. The arrangement shown, however, is very convenient and has the desirable feature that the capacity 34 serves to by-pass the current supplied to the input of the vacuum tubes by the low frequency signaling circuit around the remaining elements of the filter and around the generator circuit. The element 34, therefore, performs a double function. This description also applies to the filter circuit connected to the system HA. By means of this or equivalent arrangements several vacuum tubes or systems may be supplied from a common generator G and the negative potential applied to the grid circuit of each system may be varied independently of that applied to any of the others. Variations in leakage current through any system will have little effect in changing the voltage impressed upon that system or upon the other systems provided the generator G is a separately excited machine of low resistance. Disturbances due to armature fluctuations may be very completely eliminated.

In a system of this sort where several groups of tubes have their grid polarizing source in common it is necessary that the leads from the source of the grids of some of the tubes be of substantial length, as shown. When for this reason, or any other, grid and filament leads of substantial length are used the leads possess sufficient inductance and capacity to pick up disturbances due to stray magnetic and electrostatic fields. Where these disturbances are induced from the output circuit singing may result. In the present system (Fig. 1ᵉ) such disturbances are prevented from reaching the grids by the grid circuit filters and especially by capacities such as the capacities 34 which serve to shunt out disturbing waves picked up by the leads extending to the filament transformer and the generator G.

Fig. 2 in general corresponds to transmitter T in Fig. 1. In the following description emphasis will be put upon the features distinguishing the two systems rather than the features common thereto. The speech or low frequency currents existing in the line L, before being impressed upon the variable impedance system V, are amplified by means of a low frequency amplifier LA. The source 1 comprises a mechanical generator; hence a filter, F is provided to reduce fluctuations in the current therefrom. It will be noted that this current is supplied through a speech frequency choke coil 2 to high frequency amplifying systems HA' and HA" which are arranged in tandem with respect to each other but in parallel with respect to the variable impedance system V. By this means the modulation is entirely effected in the high frequency amplifying systems. The current to be modulated is supplied by an oscillation generating system O, receiving its space current directly from the source 1. The current generated by system O is amplified by the high frequency amplifying system HA and impressed upon the input circuit of the system HA', of which the output circuit is connected to the system HA". The output circuit of each of the high frequency amplifying systems preferably contains a circuit tuned by inductance and capacity to be resonant to the same frequency as that produced by the oscillator O. The resistance 7 and capacity 8 which are in circuit with the plate supply of the system HA function in a manner similar to the correspondingly marked elements in Fig. 1. The resistance 9 and the condenser 10 in the input circuit of the system HA" likewise function similarly to those correspondingly marked in Fig. 1. By proper adjustment the system HA″ may be made to function entirely as an amplifier or as an amplifier and modulator combined. It will be noted that no choke coils corresponding to those marked 6 in Fig. 1 are connected in circuit with the high frequency amplifying systems. A suitable source 37′ is provided to polarize the grids of those of the amplifiers which are not equipped with leak path resistances.

The filament heating system of Fig. 2 is supplied from the alternating source 30 through the transformer 31. The secondary of the transformer 31 may be regarded as a source of heating current. Mains 38 and 39 are connected across the terminals of this secondary. A neutral connection 40 is provided to which one terminal of each of the filaments is connected. Where a single vacuum tube, as, for example, LA is utilized for performing one function, this may be connected from the neutral 40 to one main 39 while this is balanced by the filament of another system, such as that of the system O connected between the neutral 40 and the main 38. Thus, for example, it will be seen that the filaments of the systems O and HA are oppositely connected with respect to the neutral lead of heating current supply system. The effect produced in one of these systems tending to modulate current in accordance wtih the alternating heating current will be compensated for to a large extent, at least, by the opposing effect produced in the other of the systems. Where, however, a plurality of tubes in parallel are used for performing a certain function, as in the systems V, HA′ and HA″, part of the filaments may be connected across one side of the heating current system and the other part across the other side. In this case, the effect produced in one tube of system V for example, is compensated for by the effect produced in the other tube of the system V, since when one cathode is made positive with respect to its associated grid, the other cathode is made correspondingly negative. Suitable filament rheostats 41, individual to each filament, are provided. No connection from the neutral conductor 40 to any intermediate point of the secondary of the transformer 31 is essential. If however, the two halves of the systems are seriously unbalanced, it may be desirable to provide such a connection which is illustrated in Figs. 2ᵃ and 2ᵇ.

In Fig. 2ᵃ, a plurality of transformers 31 and 31′ have their primary windings connected in parallel to the source 30. The transformers may have different or similar winding ratios. The mains 38 and 39 are connected in series through the secondaries. In order to save space, the tube systems except system V are omitted from Fig. 2ᵃ. The connection of the filaments of the tubes to the mains 38 and 39 and the neutral 40 is similar to that in Fig. 2. To provide for any unbalanced current a conductive connection 42 from the neutral 40 to a point intermediate to the secondaries is made. The method of connecting tubes of the remaining systems will be sufficiently understood by inspection of Figs. 2 and 2ᵃ

Fig. 2ᵇ differs from Fig. 2ᵃ in having a single transformer 31 substituted for the pair of transformers 31 and 31′. The neutral connection 42, in this case, is made to a middle point or intermediate point on the secondary of the transformer winding.

The filament heating systems of Figs. 1, 2, 2ᵃ and 2ᵇ, are interchangeable and may be used in circuits such as for Fig. 1 or Fig. 2. Certain features of these filament heating circuits may be usefully applied to systems where uni-directional current is used for heating the filaments and disturbing fluctuations are present in the uni-directional current. By utilizing a three-wire circuit and placing a part of the filaments across each side thereof, the influence of the disturbing fluctuations will be reduced.

The novel features believed to be inherent in the invention are defined in the appended claims.

What is claimed is:

1. A system comprising a plurality of vacuum tubes having filaments and input circuits, a source of alternating current for heating the filaments and connections whereby the action of said source upon the input circuit of one tube is compensated for by the action thereof upon another tube.

2. A system comprising a plurality of vacuum tubes having heated filamentary cathodes, an alternating source of filament heating current for said tubes and connections whereby the effect produced by varying the potential of a terminal of the filament of one tube at the alternating frequency is compensated for by varying the potential of a terminal of a filament of another tube.

3. A system comprising a number of space discharge devices, each having a heated filamentary cathode and a grid, a source of alternating current for causing a flow of current through said cathodes, one of said grids being connected to that terminal of its associated filament which said source tends to make more positive at a given instant while the other of said grids is connected to that terminal of its associated filament which said source tends to make more negative at a corresponding instant.

4. A plurality of vacuum tubes, cathodes therein, connections adapted for the application of an alternating electromotive force to heat said cathodes, and connections whereby the disturbing action of said electro-motive force on one set of tubes is compensated for by the action thereof upon another set of tubes.

5. A system comprising a plurality of vacuum tubes, cathodes therein, connections adapted for the application of alternating electro-motive force to said cathodes, and connections whereby the disturbing action of said alternating electro-motive force on one tube is compensated for by the action thereof upon another tube.

6. A system comprising a divided alternating current heating circuit, and a plurality of electronic discharge devices each having at least two electrodes, one of said electrodes being an electron-emitting cathode, the electron-emitting cathodes of part of said devices being connected to one branch of said circuit and part to another branch thereof.

7. A system comprising a three-wire heating circuit and a plurality of vacuum tubes having at least two electrodes, one of said electrodes being an electron-emitting cathode, the cathodes of approximately one-half of said tubes being connected between the neutral branch of said circuit and one side thereof, and the remainder connected between the neutral branch and the other side thereof.

8. In combination, a discharge device having an anode and an electron-emitting cathode for permitting space discharge current to flow through said device, a source of current of varying amplitude for rendering said cathode active to emit electrons, means actuated in response to variations of said space discharge current, and a second discharge device for opposing the effect upon said means of variations in the current from said source.

9. The combination of a plurality of vacuum tubes having separate input and output circuits, an alternating current heating circuit for the cathodes of said tubes and connections between one of said cathodes and said circuit whereby an effect upon one tube of alternating voltage applied to said circuit compensates for an effect thereof upon another tube.

10. A plurality of space discharge devices having common input and output circuits, an alternating current filament heating circuit for said devices, and connections whereby the disturbing effect of potential variations in said alternating current circuit upon one of said devices is balanced by the effect upon another thereof.

11. A system comprising a plurality of vacuum tubes, each having at least two electrodes, an alternating current filament heating circuit comprising three conductors, one of which is connected so as to be always at a potential intermediate the other two, part of said filaments being connected between said first conductor and a second of said conductors and part of said filaments being connected between said first conductor and the third conductor.

12. A filament heating means for the filaments of a plurality of three-electrode discharge tubes comprising a source of alternating current, a plurality of main leads connected across the terminals of said source, and a neutral conductor for said filaments, each filament having a terminal connected to said neutral conductor and an opposite terminal connected to one of the other main leads respectively.

13. In combination, a plurality of transformers having their primaries in parallel, their secondaries serially included in a three-wire circuit, and sets of vacuum tubes connected across each of the pairs of conductors of the three-wire circuit.

14. A thermionic system comprising a plurality of thermionic repeaters having cathodes, appropriate circuits whereby said repeaters conjointly function to repeat electrical waves, an alternating current source for the cathodes of said repeaters, and means whereby the disturbing effect produced by said source upon one of said repeaters is compensated for by the effect produced upon the other thereof.

15. In combination, a discharge device having an anode and an electron-emitting cathode for permitting space discharge current to flow through said device, a source of current of varying amplitude for rendering said cathode active to emit electrons, means actuated in response to the flow of said space discharge current, and means comprising a compensating discharge device, having a cathode rendered active by said source of current, for opposing the effect upon said first mentioned means of variations in the current from said source.

16. In combination two space discharge devices having filamentary cathodes, a current source for heating said cathodes, said cathodes being connected in series with said source, plate and grid circuits for said devices terminating at a point between the two cathodes.

17. In a combination according to claim 16, a ground connection for said point.

18. In a combination according to claim 16, an adjustable resistance in series with each cathode for regulating the heating thereof.

19. A system of space discharge devices comprising several elements in tandem arranged to repeat electrical waves, cathode-grid input circuits for said devices, cathode-anode output circuits therefor in combination with means for polarizing said grid elements with respect to said cathodes comprising a mechanical generator, and individual filters for each of the elements of said tandem system for preventing armature fluctuations from said generator from affecting said cathode-grid input circuits.

20. A system in accordance with claim 19 in which relatively long leads extend from the generator to the grids and the filters of each element are located relatively close to the grids.

21. A system comprising several space discharge devices connected in circuit and having separate grid-cathode input circuits, a source of grid polarizing potential common to said devices, leads from said source to each device, and a filter connected across the grid-cathode circuit of each device adjacent thereto.

22. In a system of space discharge devices having grids and heated cathodes operating to relay waves of relatively high frequency, wherein, on account of having common sources for a plurality of tubes or for other reasons, relatively long leads connect the grids and cathodes with their respective polarizing and heating current sources, an input impedance element connected to the grid of a space discharge device and a condenser connected directly between the cathode and that terminal of said impedance element remote from said grid.

23. A system comprising a vacuum tube, a second vacuum tube for feeding the first mentioned tube, a circuit coupling said second tube to the first mentioned tube, a condenser in series in said circuit, a source of space current for said tubes, connections for supplying space current from said source to said first mentioned tube, said connections having low impedance for alternating currents, and connections from said source to the opposite terminals of said condenser, said last mentioned connections including an impedance element of high inductance.

24. An electron discharge system comprising anode means, cathode means, a source of space current therebetween, a divided alternating current heating circuit, the respective currents in the branches of said heating circuit differing from each other in phase, portions of said cathode means being connected across respective divisions of said heating circuit whereby voltage fluctuations in one of said portions due to the heating current tend to compensate for similar fluctuations in another of said portions.

In witness whereof, I hereunto subscribe my name this 11th day of August A. D., 1920.

RAYMOND A. HEISING.